US010332285B2

(12) United States Patent
Matejka et al.

(10) Patent No.: US 10,332,285 B2
(45) Date of Patent: Jun. 25, 2019

(54) TECHNIQUES FOR AUTOMATIC AND DYNAMIC OPACITY SETTINGS FOR SCATTERPLOTS

(71) Applicant: AUTODESK, Inc, San Rafael, CA (US)

(72) Inventors: Justin Frank Matejka, Newmarket (CA); Fraser Anderson, Camrose (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 242 days.

(21) Appl. No.: 14/732,611

(22) Filed: Jun. 5, 2015

(65) Prior Publication Data

US 2016/0358351 A1    Dec. 8, 2016

(51) Int. Cl.
*G06T 11/20*    (2006.01)
(52) U.S. Cl.
CPC .................. *G06T 11/206* (2013.01)
(58) Field of Classification Search
CPC ..................................... G06T 11/206
See application file for complete search history.

(56) References Cited

U.S. PATENT DOCUMENTS

2013/0088493 A1*  4/2013  Hao ...................... G06T 11/203
                                                        345/440

OTHER PUBLICATIONS

Mayorga et al. ("Splatterplots: Overcoming Overdraw in Scatter Plots", EEE Transactions on Visualization and Computer Graphics, vol. 19, No. 9, Sep. 2013.*
Heer et al. Crowdsourcing Graphical Perception: Using Mechanical Turk to Assess Visualization Design. ACMCHI, 203-212. CHI 2010.*
Few et al. "Solutions to the Problem of Over-Plotting in graphs,", Visual Business Intelligence Newsletter, Sep./Oct. 2008.*
Fast, M. "What the heck is PITCHf/x", The Hardball times annual, 2010, 153-8.
Few, S. Solutions to the problem of Over-plotting in Graphs. Visual Business intelligence Newsletter, 2008.
Heer, J. and Bostock, M. Crowdsourcing Graphical Perception: "Using Mechanical Turk to Assess Visualization Design". ACM CHI 10, 2010, 203-212.
Kittur, A., Chi, E.H., and Suh, B, Crowdsourcing User Studies with Mechanical Turk. ACM CHI (2008), 453-456.

(Continued)

*Primary Examiner* — Tapas Mazumder
(74) *Attorney, Agent, or Firm* — Artegis Law Group, LLP

(57) ABSTRACT

An opacity engine for automatically and dynamically setting an opacity level for a scatterplot based on a predetermined value for a mean opacity level of utilized pixels (MOUP) in the scatterplot. The opacity engine may automatically set the opacity level for the scatterplot to produce the predetermined MOUP value in the scatterplot. A utilized pixel in the scatterplot comprises a pixel displaying at least one data point representing data. The MOUP value in the scatterplot may be equal to the sum of the final opacity levels of all utilized pixels in the chart, divided by the number of utilized pixels in the chart. The predetermined MOUP value may be between 35%-45%, such as 40%. The opacity engine may adjust the determined opacity level for charts having relatively low over-plotting factors.

20 Claims, 6 Drawing Sheets

(56) References Cited

OTHER PUBLICATIONS

Luboschik, M., Radloff, A., and Schumann, H. A New Weaving Technique for Handling Overlapping Regions. ACM AVI (2010), 25-32.
Mayorga, A. and Gleicher, M. Splatterplots: Overcoming Overdraw in Scatter Plots. IEEE Transactions on Visualization and Computer Graphics 19, 9 (2013) 1526-1538.
Porter, T. and Duff, T. "Compositing Digital Images", ACM SIGGRAPH (1984), 253-259.

* cited by examiner

TECHNIQUES FOR AUTOMATIC AND DYNAMIC OPACITY SETTINGS FOR SCATTERPLOTS

BACKGROUND OF THE INVENTION

Field of the Invention

The present invention generally relates to computer science and, more specifically, to techniques for automatic and dynamic opacity settings for scatterplots.

Description of the Related Art

Scatterplots are an effective and commonly used technique to show the relationship between two-dimensional data within a dataset and to visualize the distribution of the data to quickly identify similarities and outliers within the dataset. In a scatterplot, data in the dataset may be graphically represented as data points on a two-dimensional chart. As the number of data points increases, however, the scatterplot may suffer from "over-plotting" as the ratio of data points to chart area increases and the data points show significant overlapping on the chart. When over-plotting occurs, data points can be occluded and information may be lost. This can make it difficult or impossible to see the individual data points and lead to misinterpretation of the data, or the inability to perceive the date's underlying distribution.

One solution to over-plotting is to manually reduce the opacity level of the data points until the data points and the underlying distribution are more discernible in the chart. However, setting the opacity level may be a time-consuming manual task that requires trial and error to find an opacity level that provides a visual improvement in the chart.

As the foregoing illustrates, there is a need for a more effective technique for generating and displaying scatterplots.

SUMMARY OF THE INVENTION

One embodiment of the invention includes a computer-implemented method for setting opacity levels for scatterplot charts. The method includes displaying a plurality of data points on a scatterplot chart, the data points being derived from a dataset. The method also includes determining an opacity level setting for the plurality of data points based at least in part on a predetermined value for a mean opacity level of utilized pixels (MOUP) in the scatterplot chart. Each utilized pixel in the scatterplot chart comprises a pixel that represents at least one data point in the plurality of data points.

One advantage of the disclosed technique is that the optimal opacity level of a scatterplot may be automatically and dynamically set without requiring manual setting of the opacity level which is time-consuming and requires trial and error.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
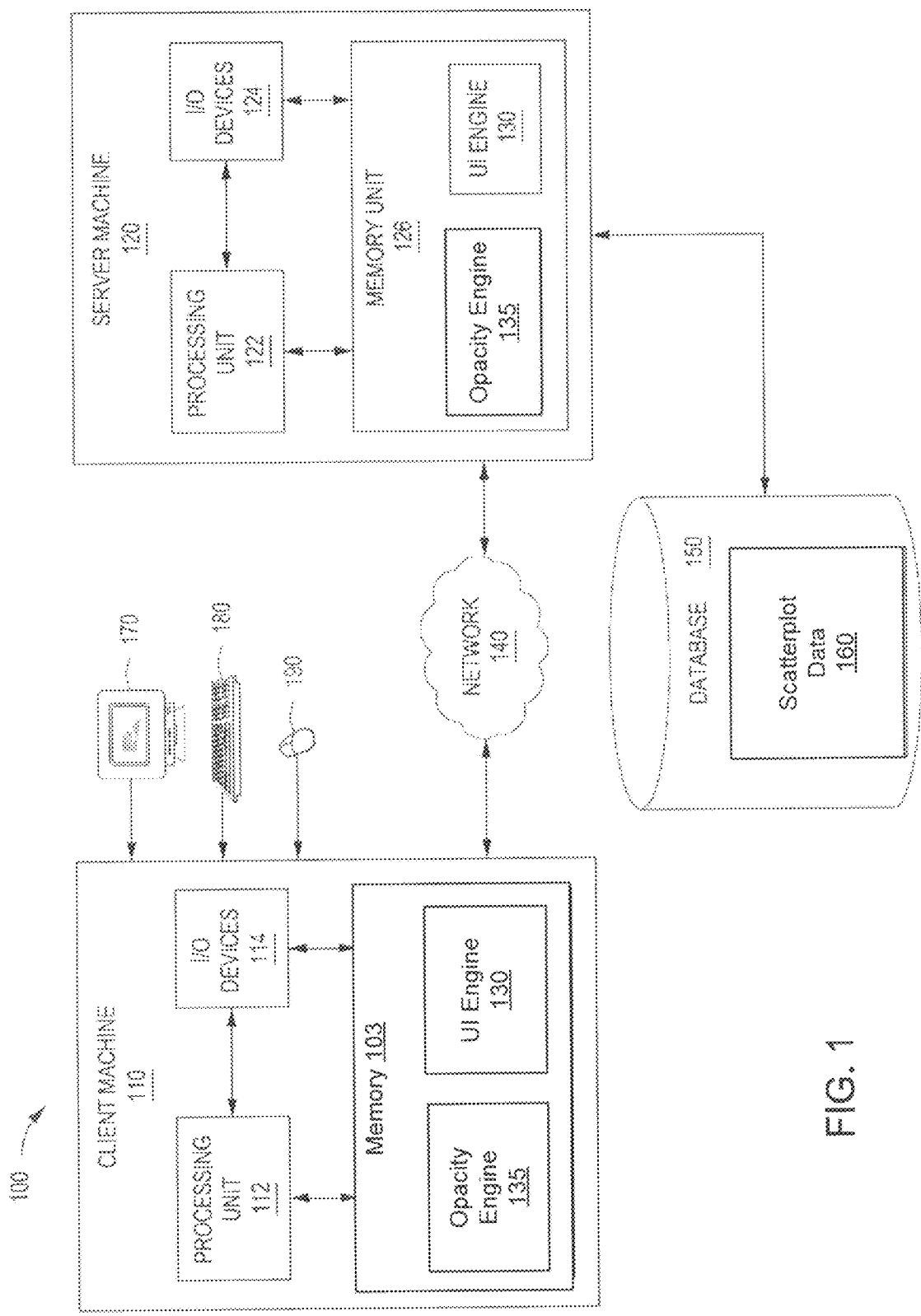
FIG. 1 illustrates a system configured to implement one or more aspects of the present invention.

FIG. 1 illustrates a system 100 configured to implement one or more aspects of the present invention. As shown, the system includes a client machine 110 coupled to a server machine 120 by network 140. Server machine 120 is also coupled to a database 150. Client machine 110 represents a client computing device configured to interact with server machine 120. Client machine 110 may be a workstation, a laptop computer, a tablet or hand-held device, or any other device capable of displaying the output.

Client machine 110 includes processing unit 112 coupled to input/output (I/O) devices 114 and to memory unit 103. Processing unit 112 may be a central processing unit (CPU), a graphics processing unit (GPU), or a combination of different processing units, such as a CPU configured to operate in conjunction with a GPU. In general, processing unit 112 may be any technically feasible hardware unit capable of processing data and/or executing software applications. I/O devices 114 are also coupled to memory 103 and includes devices capable of receiving input, devices capable of producing output, as well as devices capable of communicating via network 140. Client machine 110 communicates with server machine 120 over network 140 using I/O devices 114. Client machine 110 is further coupled to display device 170, keyboard 180, and mouse 190, which afford the end-user access to system 100. Memory 103 further includes an opacity engine 135 and a user interface (UI) engine 130.

Server machine 120 is a computing device that may reside within a data center remote from client machine 110. Server machine 120 includes processing unit 122 coupled to I/O devices 124 and to memory unit 126. Processing unit 122 may be a central processing unit (CPU), a graphics processing unit (GPU), or a combination of different processing units, such as a CPU configured to operate in conjunction with a GPU. I/O devices 124 are also coupled to memory unit 126 and may include devices capable of receiving input, such as a keyboard, mouse, or other input elements, as well as devices capable of producing output such as a monitor, printer, or other output elements. Server machine 120 communicates with client machine 110 over network 140 using I/O devices 124. Memory unit 126 further includes opacity engine 135 and UI engine 130.

Server machine 120 is also coupled to database 150, which organizes and stores datasets comprising scatterplot data 160. A dataset comprises a grouping of related scatterplot data 160. Scatterplot data 160 may comprise any type of data that can be visually/graphically represented as data points on a two-dimensional chart/grid. In some embodiments, scatterplot data 160 is described by at least two different attributes and comprises corresponding values for the at least two different attributes. Although scatterplot data 160 may comprise corresponding values for more than two different attributes, only two attributes and the corresponding values may be graphically represented on the two-dimensional chart at a given time. In further embodiments, however, the scatterplot data 160 is used in three-dimensional applications that graphically represent the scatterplot data 160 in a three-dimensional scatterplot chart. In these embodiments, a two-dimensional view is generated from the three-dimensional scatterplot chart using embodiments described herein.

In some embodiments, the user interface (UI) engine 130 of the server machine 120 may generate an interactive scatterplot that visually represents the scatterplot data 160 as data points on a two-dimensional chart. For example, a user may interact with the scatterplot to select particular datasets and/or attributes to be displayed in the scatterplot, select an opacity level for the scatterplot, etc. In some embodiments, the opacity engine 135 of the server machine 120 automatically and dynamically sets the opacity level for the scatterplot based on predetermined values and algorithms to improve readability of the data points. The opacity engine 135 and its functions are further described in subsequent figures.

The UI engine 130 and opacity engine 135 may reside on the server machine 120 and/or a remote client machine 110 that accesses the database 150 via network 140. The end-user may input queries and commands to client machine 110 via display device 170, keyboard 180, mouse 190, and/or other I/O devices 114. In response, client machine 110 initiates a request to server machine 120 to transfer the requested data and the UI engine 130 manipulates the data provided by server machine 120, in order to create viewable video output via I/O devices 114.

Figure 2:
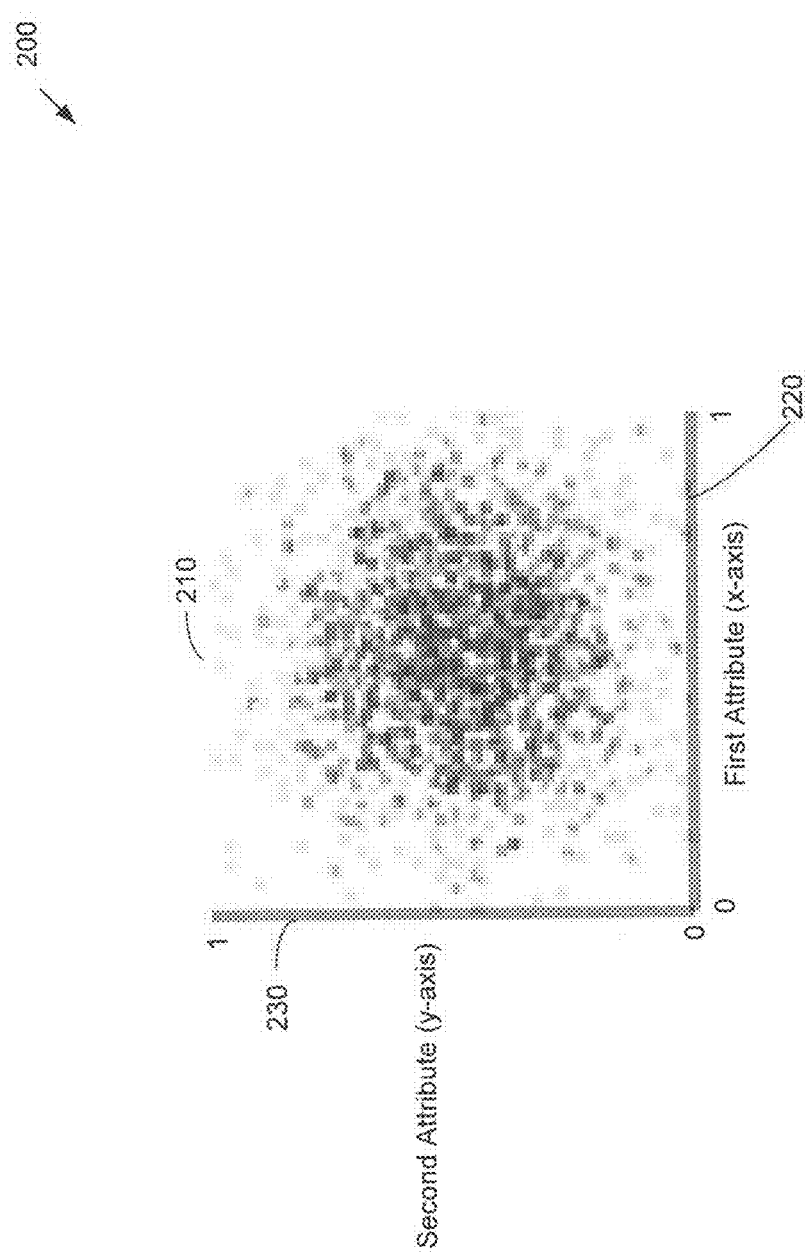
FIG. 2 shows a screenshot of an interactive scatterplot generated by the UI engine of FIG. 1, according to one embodiment of the present invention.

FIG. 2 shows a screenshot of an interactive scatterplot 200 generated by the UI engine 130 of FIG. 1, according to one embodiment of the present invention. As shown in FIG. 2, the scatterplot 200 comprises a two-dimensional chart 210 showing a plurality of data points (shown as square dots).

The plurality of data points are derived from a selected dataset. For example, the plurality of data points may graphically represent data of a selected dataset. The chart 210 comprises an x-axis 220 representing a first attribute and a y-axis 230 representing a second attribute of the data. In the example of FIG. 2, values for the first and second attributes range/span from 0 to 1. In other embodiments, any range or type of values for attributes may be used.

The UI engine 130 configures pixels of the scatterplot 200 to display the chart 210 and data points. The UI engine 130 may configure the chart 210 to have a predetermined pixel size/area and dimensions and also configure each data point to have a same predetermined pixel size/area and dimensions. For example, the chart 210 may comprise an 80×80 pixel square and each data point may comprise a 2×2 pixel square. In other embodiments, other pixel sizes and shapes for the chart 210 and/or the data points may be used. In further embodiments, a data point may be graphically represented by any other type of geometric shape or icon other than a square dot, such as a rectangle, circle, line, "x" "+," or the like.

As the number of data points plotted on the chart 210 increases, however, the scatterplot 200 may suffer from "over-plotting" as the ratio of the total pixel area for the data points to the pixel area for the chart increases and the data points show significant overlapping on the chart. When over-plotting occurs, it is difficult or impossible to discern individual data points and perceive the underlying distribution of data points. In general, an over-plotting factor (OPF) is equal to the total pixel area needed for displaying all data points (assuming there is no overlapping of the data points) divided by the total pixel area of the chart. In some embodiments, the over-plotting factor (OPF) is defined by the below equation:

$$OPF = \frac{\# DPs \times \text{area\_DP}}{\text{area\_Chart}} \qquad (1)$$

where #DPs is the total number of data points currently displayed in the chart 210, area_DP is the pixel area of each data point, and area_Chart is the pixel area of the chart 210. For example, if a chart has an over plotting factor of 4, there are 4 times as many pixels needed to represent the data than are available in the chart, so over-plotting will be necessary.

A current solution to over-plotting is to manually set the opacity level of the scatterplot until the data points are more readable in the chart. However, setting the opacity level may be a time-consuming manual task that requires trial and error to find an opacity level that provides a visual improvement in the chart. In some embodiments, the opacity engine 135 of the server machine 120 automatically and dynamically sets the opacity level for the scatterplot to improve readability of the data points, which allows the individual data points and the underlying distribution of data points more discernable to the user. As used herein, "setting the opacity level" of a scatterplot 200 or chart 210 refers to setting/establishing the opacity level of the data points displayed in the chart 210 to a determined opacity level, each data point being set to this determined opacity level. As used herein, "the opacity level setting" of a scatterplot 200 or chart 210 refers to the opacity level that has been determined for the data points displayed in the chart 210, each data point being set to this determined opacity level. The opacity level of the data points will affect how much a data point will obscure another data point when the data points overlap.

As known in the art, the opacity level of a pixel may be defined by an alpha channel with a value between 0 and 1. A value of 0 indicates that a pixel (e.g., data point pixel) is transparent and a value of 1 indicates that a pixel is completely opaque. The opacity level may also be defined in other ways. For example, the opacity level may range from 0% (corresponding to an alpha value of 0 indicating the pixel is transparent) and 100% (corresponding to an alpha value of 1 indicating the pixel is completely opaque). In other embodiments, other techniques and values may be used to modify and measure the opacity level of the data points.

Manually Setting Opacity Levels for Scatterplots

Described in this section is a study that was performed for analyzing manual settings of opacity levels for various scatterplots by study participants. The study provided data and analysis that was used to produce values and algorithms used by the opacity engine 135 to automatically and dynamically set opacity levels for scatterplots. Each trial in the study consisted of showing a participant a scatterplot 200, and having the participant adjust the opacity level of data points in the chart 210 of the scatterplot 200 (e.g., by moving an opacity slider left and right). The participants were instructed to set the opacity level to what they thought provided the best overall readability of the data points in both the light and dark areas of the chart.

To capture data for a range of opacity values from charts with little or no over-plotting (relatively low OPF values), to charts with a great deal of over-plotting (relatively high OPF values), charts with several different numbers of data points should be used. For example, in the study, charts with 27 different numbers of data points were generated, the number of data points ranging from 1 ($1^3$) to 19,683 ($27^3$). All charts 210 in the study had an 80×80 pixel area/size, and all data points had a 2×2 pixel area/size, resulting in over-plotting factors (OPFs) ranging from 0.0006× for charts displaying 1 data point, to 12.3× for charts displaying 19,683 data points.

Figure 3:
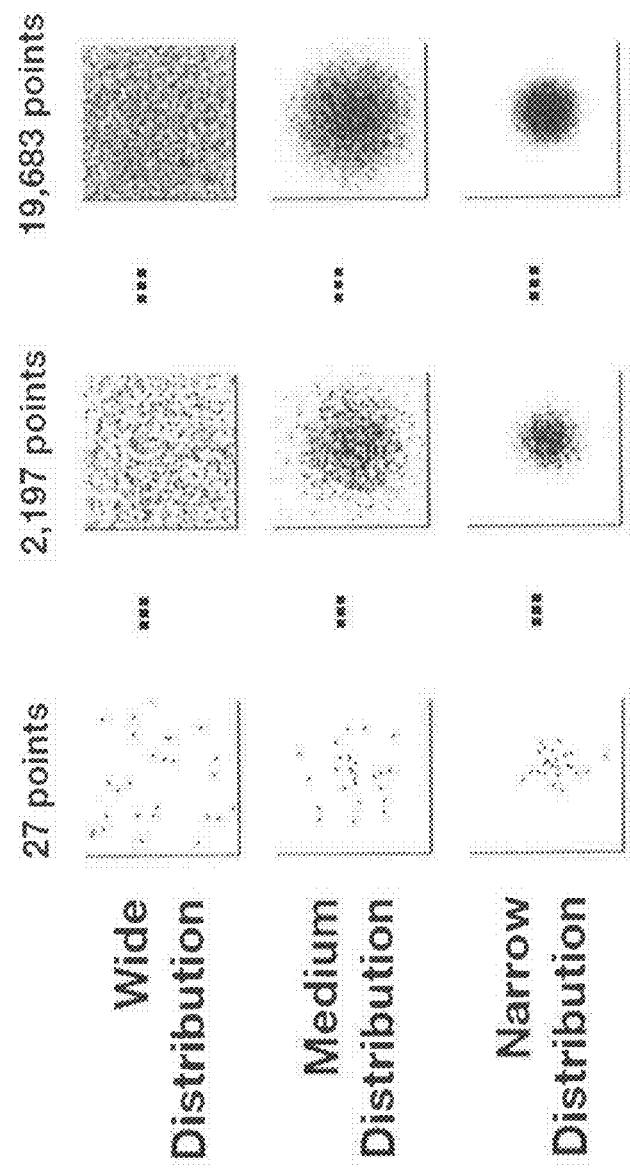
FIG. 3 shows scatterplots of three different distribution types used in a participant study, according to one embodiment of the present invention.

Also considered in the study was how the distribution of the data points within the chart would affect the ideal opacity setting. FIG. 3 shows scatterplots of three different distribution types used in a participant study, according to one embodiment of the present invention. As shown in FIG. 3, the three distribution types used in the study were wide, medium, and narrow, with examples of charts having 27 data points, 2197 data points, and 19,683 data points. All three distribution types were Gaussian distributions centered at 0.5 and bound between 0 and 1 on each axis, with standard deviations of 0.7, 0.2, and 0.1 respectively. The study was divided into 3 blocks, with each participant selecting an opacity value for each of the 81 different charts (3 distribution types×27 different numbers of data points) that were presented in a random order within each block, for a total of 243 trials per participant.

Figure 4:
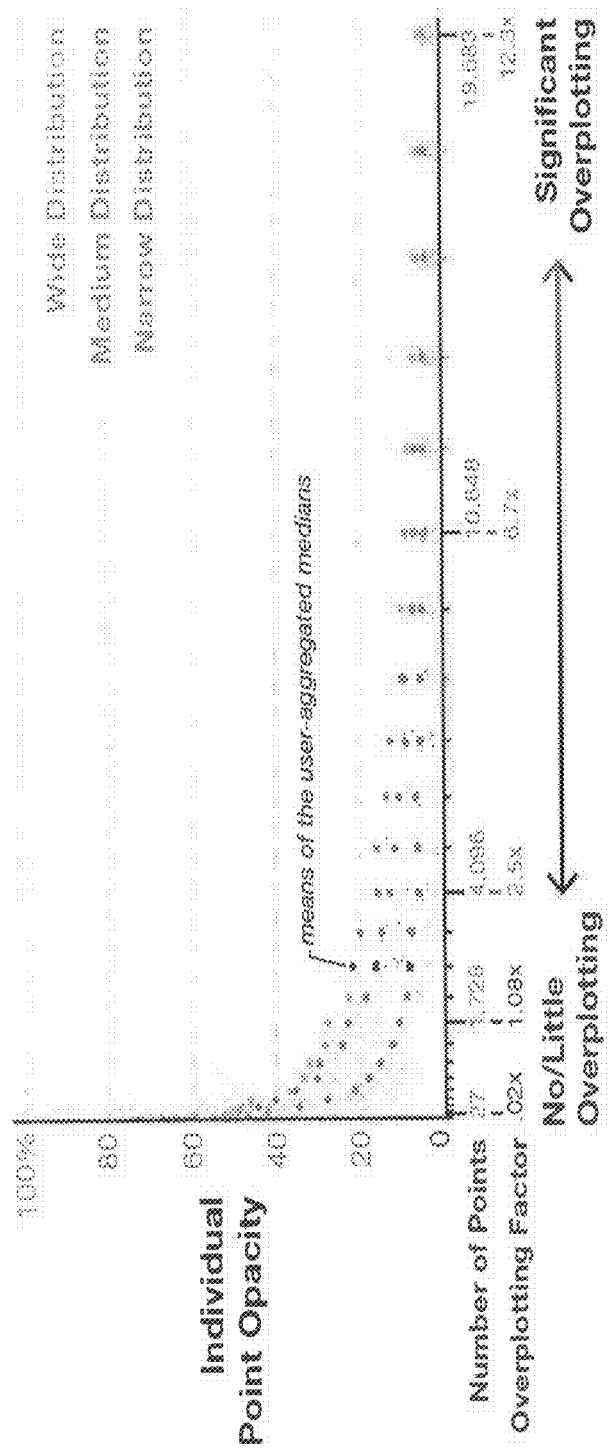
FIG. 4 shows different measurements of opacity levels based on the scatterplots of FIG. 3, according to one embodiment of the present invention.

FIG. 4 shows different measurements of opacity levels based on the scatterplots of FIG. 3, according to one embodiment of the present invention. In particular, FIG. 4 shows individual measurements of opacity levels as well as the averaged participant-medians of opacity levels from the 81 different charts. Note that in the example of FIG. 4, the opacity level ranges from 0% (corresponding to an alpha value of 0 meaning each data point pixel is transparent) and 100% (corresponding to an alpha value of 1 meaning each data point pixel is opaque). As expected, the distribution type was a significant factor ($F_{2,25}$=31.9, p<0.0001) in the resulting opacity values, with the wide distribution having the highest opacity levels and narrow the lowest opacity levels.

To model the participant-generated opacity curves shown in FIG. 4, we wanted to find a property of the resulting scatterplot that stayed relatively constant independent of the distribution type and number of data points in a scatterplot. The resulting participant data was studied extensively and a number of metrics were investigated, including the mean and opacity level of all pixels in the graph.

However, a promising metric was discovered by using the mean opacity level of only the "utilized" pixels (MOUP) in the scatterplot. As used herein, a "utilized" pixel in the scatterplot 200 comprises a pixel in the chart 210 displaying at least one data point. In significant over-plotting situations, a utilized pixel may display several overlapping data points. In terms of opacity levels, a utilized pixel in the chart 210 comprises a pixel having an opacity level greater than 0 (where an opacity level of 0 indicates a pixel is transparent). For example, the opacity levels may range from 0 to 1, 0% to 100%, or any other range. In these embodiments, it is assumed that the default opacity level of all pixels in the chart 210 is initially set to 0 prior to plotting any data points on the chart 210. In other embodiments, where the default opacity level of all pixels in the chart 210 is initially set to a value higher than 0, a utilized pixel in the scatterplot comprises a pixel having an opacity level greater than the default opacity level of the chart 210.

In some embodiments, the mean opacity level of the utilized pixels (MOUP) in the chart 210 is equal to the sum of the final opacity levels of all utilized pixels in the chart 210, divided by the number of utilized pixels in the chart 210. Assuming that the default opacity level of the scatterplot chart 210 is set to 0, the mean opacity level of the utilized pixels (MOUP) is also equal to the sum of the final opacity levels of all pixels in the chart 210, divided by the number of utilized pixels in the chart 210. The final opacity level of a particular utilized pixel is based on the number of data points displayed by the particular utilized pixel, as discussed below.

Figure 5:
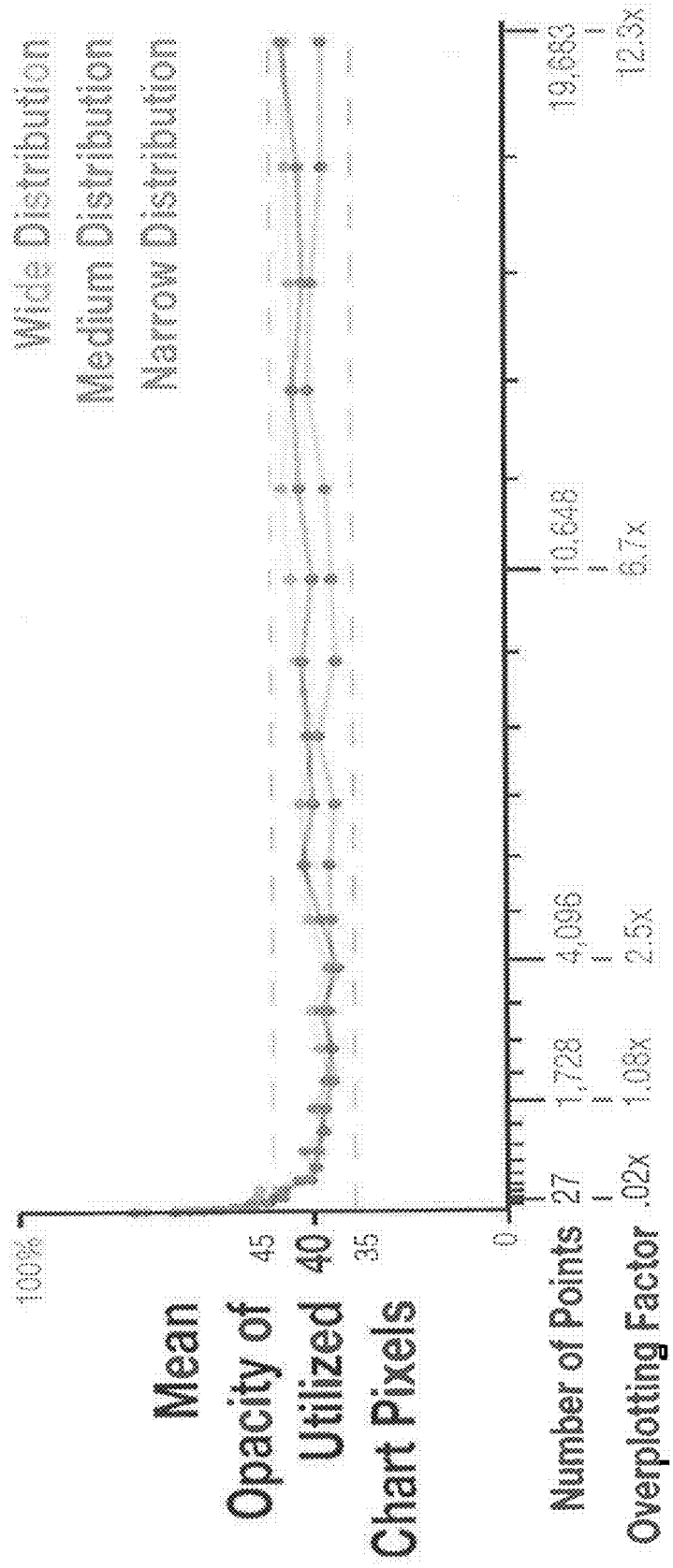
FIG. 5 shows different mean opacity level values associated with utilized pixels (MOUP) produced from the opacity level measurements of FIG. 4, according to one embodiment of the present invention.

FIG. 5 shows different mean opacity level values associated with utilized pixels (MOUP) produced from the opacity level measurements of FIG. 4, according to one embodiment of the present invention. As shown in FIG. 5, except where the over-plotting factor is very low, the MOUP value stays relatively constant at around 40% (p=39.62, 95% CI [38.39, 40.35]) and does not seem to be significantly impacted by the distribution type. This observed property holds for all over-plotting factors, except where the over-plotting factor is very low (approximately 0.5× or below). It is this observed property that was used in configuring the opacity engine 135 to automatically and dynamically set the opacity level for the scatterplot 200.

Automatically and Dynamically Setting Opacity Levels for Scatterplots

The opacity engine 135 automatically and dynamically sets the opacity level for the chart 210 of the scatterplot 200 based on a predetermined MOUP value. In some embodiments, the predetermined MOUP value is approximately 40%. In other embodiments, the predetermined MOUP value is between 35%-45%. However, the predetermined MOUP value of 40% and the predetermined MOUP value range between 35%-45% are for exemplary purposes only and predetermined MOUP values outside the range of 35%-45% may also be used. In these embodiments, the predetermined MOUP value is any other predetermined value outside of the range of 35%-45%. The opacity engine 135 automatically sets the opacity level for the chart 210 based on the predetermined MOUP value whenever a plurality of data points are displayed in the chart 210 and thereafter, dynamically sets/adjusts the opacity level for the chart 210 based on the predetermined MOUP value whenever additional data points are displayed. For example, for an initial set of displayed data points, the opacity engine 135 may automatically set the opacity level for the chart 210 to achieve/produce a MOUP value of approximately 40% in the chart 210, and as additional data points are displayed, dynamically adjust the opacity level for the chart 210 to still achieve/produce the MOUP value of approximately 40% in the chart 210.

The opacity engine 135 is configured to execute an opacity algorithm that automatically sets the opacity level for the chart 210 to produce the predetermined MOUP value in the chart 210. At any given time, the mean opacity level of the utilized pixels (MOUP) value in the chart 210 is equal to the sum of the final opacity levels of all utilized pixels in the chart 210, divided by the number of utilized pixels in the chart 210. Assuming that the default opacity level of the scatterplot chart 210 is set to 0, the mean opacity level of the utilized pixels (MOUP) is also equal to the sum of the final opacity levels of all pixels in the chart 210, divided by the number of utilized pixels in the chart 210.

Thus, the opacity algorithm first counts the number of utilized pixels in the chart 210. For each pixel in the chart 210, the opacity algorithm determines a final opacity level for the pixel by determining the number of data points displayed by the utilized pixel. When a pixel displays only one data point, the final opacity level of the utilized pixel is the opacity level setting that has been set for the chart 210. When a pixel displays two or more data points (comprising two or more overlapping layers each at a same opacity level setting), the final opacity level of the pixel may be determined using techniques known in the art. For example, based on a standard color blending model, the final opacity level ($O_f$) of a pixel given a number of overlapping layers (l), each at the same opacity level setting ($\alpha$), can be calculated as follows:

$$O_f(l, \alpha) = \begin{cases} \alpha + O_f(l-1, \alpha) \cdot \alpha, & l > 1 \\ \alpha, & l = 1 \end{cases} \quad (2)$$

The MOUP value of the chart 210 with a set of p pixels (P), with a specified number of layers ($l_p$) and a particular opacity level setting ($\alpha$), can be calculated as follows:

$$MOUP(P, \alpha) = \frac{\sum_P^p O_f(l_p, \alpha)}{\sum_P^p 1, \text{ where } l_p > 0} \quad (3)$$

The opacity algorithm then determines an opacity level setting ($\alpha_{MOUP\_x}$) for the data points in the chart 210 that produces the predetermined MOUP value in the chart 210. For example, if the predetermined MOUP value is approximately 40%, the opacity level setting ($\alpha_{MOUP\_0.4}$) for the data points that produces a MOUP value of approximately 40% in the chart 210 is calculated as follows:

$$MOUP(P, \alpha) = 0.4, \text{ where } \alpha = \alpha_{MOUP\_0.4} \quad (4)$$

As shown in FIG. 5, the MOUP values determined in the participant study stays relatively constant at around 40%, except where the over-plotting factor (OPF) is relatively low. When automatically and dynamically setting the opacity level for a chart based on the predetermined MOUP value, the opacity engine 135 may adjust the opacity level setting for the chart 210 based on the over-plotting factor (OPF) of the chart 210.

For relatively low over-plotting factors, the opacity algorithm may determine an opacity level setting for the chart 210 that is lower than desired compared to the opacity level settings observed for relatively low over-plotting factors in the participant study. For relatively low over-plotting factors, the difference between the opacity level settings produced by the opacity algorithm and observed in the participant study is fairly consistent across the different distribution types and follows a logarithmic distribution. The opacity algorithm may adjust the opacity level setting for charts having relatively low over-plotting factors. In some embodiments, the opacity algorithm increases the opacity level setting for charts having an over-plotting factor below a predetermined threshold (e.g., less than 0.5×, 0.8×, etc.) using a low density multiplier ($LDM_{opf}$) term.

In some embodiments, the opacity algorithm uses the low density multiplier ($LDM_{opf}$) term to adjust the determined original opacity level setting based on the over-plotting factor (opf) of the chart 210. The low density multiplier ($LDM_{opf}$) term can be calculated as follows:

$$LDM_{opf} = \min\left\{1, 1 - 0.15 \times \log\left(\frac{opf}{0.75}\right)\right\} \quad (5)$$

In these embodiments, the opacity algorithm calculates an adjusted optimal opacity level setting ($\alpha_{optimal}$) by multiplying the original opacity level setting ($\alpha_{MOUP\_x}$) with the LDM term ($LDM_{opf}$). For example, if the predetermined MOUP value is approximately 40%, the adjusted optimal opacity level setting ($\alpha_{optimal}$) is calculated as follows:

$$\alpha_{optimal} = LDM_{opf} \times \alpha_{MOUP\_0.4} \quad (6)$$

As shown in above equations (5) and (6), the LDM term only affects the calculations for the opacity level settings for charts 210 with an over-plotting factor less than 0.8×, otherwise the LDM term evaluates to equal 1 and has no effect on the original opacity level setting.

Figure 6:
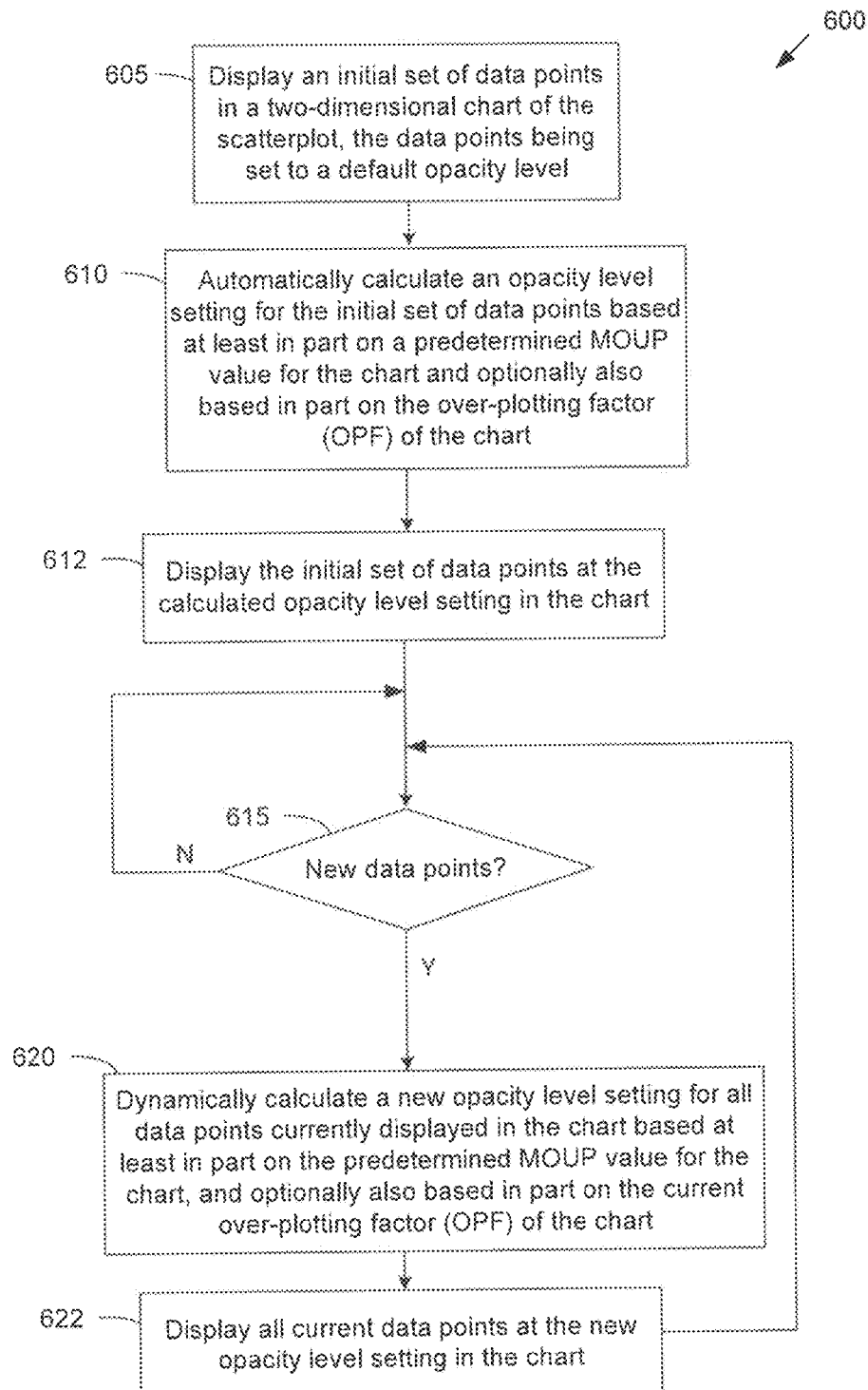
FIG. 6 illustrates a flow diagram of method steps for setting an opacity level for a scatterplot, according to one embodiment of the present invention.

FIG. 6 illustrates a flow diagram of method steps for setting an opacity level for a scatterplot, according to one embodiment of the present invention. Although the method steps are described in conjunction with the systems of FIG. 1-5, persons skilled in the art will understand that any system configured to perform the method steps, in any order, is within the scope of the present invention.

As shown, a method 600 begins at step 605, where UI engine 130, when executed by processing unit 122, displays an initial set of data points in a two-dimensional chart 210 of an interactive scatterplot 200. The initial set of data points comprises a plurality of data points that graphically represent data of a dataset in the chart 210. An opacity level for the data points may be set to a default level, such as 1 or 100% so that each data point is initially opaque.

At step 610, the opacity engine 135, automatically calculates an opacity level setting for the initial set of data points displayed in the chart 210 based at least in part on a predetermined MOUP value for the chart 210. For example, the predetermined MOUP value may be approximately 40%, may be between 35%-45%, or may be any other predetermined value. A utilized pixel in the chart 210 comprises a pixel in the displaying at least one data point. In terms of opacity levels, a utilized pixel in the chart 210 comprises a pixel having an opacity level greater than 0. The opacity engine 135 may execute an opacity algorithm that automatically determines the opacity level setting that produces/achieves the predetermined MOUP value. For example, if the predetermined MOUP value is approximately 40%, the opacity algorithm may calculate the opacity level setting ($\alpha_{MOUP\_0.4}$) for the data points using equation (4). In an alternative embodiment, the opacity algorithm calculates the opacity level setting based at least in part on the predetermined MOUP value and based at least in part on the over-plotting factor (OPF) of the chart 210. For example, the opacity algorithm may adjust the opacity level setting based on the over-plotting factor (OPF) of the chart 210 (e.g., adjusts for charts 210 having relatively low over-plotting factors). For example, if the predetermined MOUP value is approximately 40%, the opacity algorithm may calculate an adjusted opacity level setting ($\alpha_{MOUP\_0.4}$) for the data points using equation (6).

At step 612, the UI engine 130, displays in the chart 210 the initial set of data points using the calculated opacity level setting.

At step 615, the UI engine 130 determines whether at least one additional/new data point is displayed after the initial set of data points are displayed in the chart 210. If not, then the UI engine 130 continues to check for new data points at step 615. If so, then the method continues at step 620, where the opacity engine 135 dynamically calculates a new opacity level setting for all data points currently displayed in the chart 210 (which includes all new data points and the initial set of data points) based at least in part on the predetermined MOUP value for the chart 210. In some embodiments, the new opacity level setting may also be based on the current over-plotting factor (OPF) of the chart. The calculation of the opacity level setting at step 620 is similar to the calculation of the opacity level setting at step 610, except that the current data points (including the new data points) are also considered in the calculations. Similar to step 610, the new calculated opacity level also achieves the predetermined MOUP value.

At step 622, the UI engine 130, displays in the chart 210 all current data points using the new calculated opacity level setting. The method 600 then continues at step 615, where the UII engine 130 again determines whether any new data points are displayed in the chart 210, as previously described herein.

In sum, a computing device (such as opacity engine 135 on a server machine 120) is configured to automatically and dynamically sets the opacity level for the chart 210 of the scatterplot 200 based on a predetermined MOUP value. The opacity engine 135 automatically sets the opacity level for the chart 210 to produce the predetermined MOUP value in the chart 210. A utilized pixel in the scatterplot comprises a pixel displaying at least one data point representing data. At any given time, the mean opacity level of the utilized pixels (MOUP) value in the chart 210 is equal to the sum of the final opacity levels of all utilized pixels in the chart 210, divided by the number of utilized pixels in the chart 210. In some embodiments, the predetermined MOUP value is approximately 40%. In other embodiments, the predetermined MOUP value is between 35%-45%. The opacity engine 135 automatically sets the opacity level for the chart 210 based on the predetermined MOUP value whenever a plurality of data points are displayed in the chart 210 and thereafter, dynamically adjusts the opacity level for the chart 210 based on the predetermined MOUP value whenever additional data points are displayed.

In some embodiments, the opacity engine 135 adjusts the determined opacity level for charts having relatively low over-plotting factors (OPFs). The opacity engine 135 may calculate the adjusted optimal opacity level setting for such a chart by multiplying the original opacity level setting with a low density multiplier term to adjust the original opacity level setting based on the over-plotting factor of the chart 210. In some embodiments, the LDM term may only affect the calculations for the opacity level settings for charts with an over-plotting factor less than 0.8×, otherwise the LDM term evaluates to equal 1 and has no effect on the original opacity level setting.

An advantage of the disclosed technique is that the optimal opacity level of a scatterplot chart may be automatically and dynamically set without requiring manual setting of the opacity level which is time-consuming and requires trial and error. An optimal opacity level may be determined for scatterplot charts in situations with both low and high over-plotting factors. The opacity algorithm output producing the optimal opacity level can be easily integrated into existing scatterplot applications and implementations, making it useful under a variety of over-plotting scenarios.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for setting opacity levels for scatterplot charts, the method comprising:
    displaying, in a graphical user interface (GUI) on a display device, a plurality of data points on a scatterplot chart generated by a user interface engine executing on a computer processor, the data points being derived from a dataset;
    receiving a predetermined value for a mean opacity level of utilized pixels (MOUP) in the scatterplot chart;
    determining, by the computer processor, an opacity level setting for the plurality of data points based at least in part on the predetermined value, wherein each utilized pixel in the scatterplot chart comprises a pixel that represents at least one data point in the plurality of data points;
    setting, by the computer processor, an opacity level for the scatterplot chart to the determined opacity level setting; and
    displaying, in the GUI on the display device, the plurality of data points on the scatterplot chart at the opacity level.

2. The computer-implemented method of claim 1, wherein the opacity level setting for the plurality of data points produces the predetermined value for the MOUP in the scatterplot chart.

3. The computer-implemented method of claim 2, wherein the predetermined value for the MOUP is approximately 40%.

4. The computer-implemented method of claim 2, wherein the predetermined value for the MOUP is between 35%-45%.

5. The computer-implemented method of claim 1, further comprising:
    displaying at least one new data point in the scatterplot chart; and
    dynamically determining a new opacity level setting for all data points displayed in the scatterplot chart, including the at least one new data point based at least in part on the predetermined value for the MOUP in the scatterplot chart.

6. The computer-implemented method of claim 5, wherein the new opacity level setting produces the predetermined value for the MOUP in the scatterplot chart.

7. The computer-implemented method of claim 1, wherein the opacity level setting is further based on an over-plotting factor associated with the scatterplot chart, the over-plotting factor comprising a total pixel area utilized when displaying the plurality of data points divided by a pixel area of the scatterplot chart.

8. The computer-implemented method of claim 1, wherein:
    data comprising the dataset are described by at least a first attribute and second attribute; and
    the scatterplot chart comprises a two-dimensional grid having a horizontal axis representing different values of the first attribute and a vertical axis representing different values of the second attribute.

9. The computer-implemented method of claim 1, further comprising displaying each data point included in the plurality of data points within the scatterplot chart at the determined opacity level setting.

10. One or more non-transitory computer-readable media storing program instructions that, when executed by one or more processors, cause the one or more processors to set an opacity level for a scatterplot chart by performing the steps of:
    displaying, in a graphical user interface (GUI) on a display device, a plurality of data points on a scatterplot chart generated by a user interface engine executing on a computer processor, the data points being derived from a dataset;
    receiving a predetermined value for a mean opacity level of utilized pixels (MOUP) in the scatterplot chart;
    determining, by the computer processor, an opacity level setting for the plurality of data points based at least in part on the predetermined value, wherein each utilized pixel in the scatterplot chart comprises a pixel that represents at least one data point in the plurality of data points;
    setting, by the computer processor, an opacity level for the scatterplot chart to the determined opacity level setting; and
    displaying, in the GUI on the display device, the plurality of data points on the scatterplot chart at the opacity level.

11. The one or more non-transitory computer-readable media of claim 10, wherein the opacity level setting for the plurality of data points produces the predetermined value for the MOUP in the scatterplot chart.

12. The one or more non-transitory computer-readable media of claim 11, wherein the predetermined value for the MOUP is approximately 40%.

13. The one or more non-transitory computer-readable media of claim 11, wherein the predetermined value for the MOUP is between 35%-45%.

14. The one or more non-transitory computer-readable media of claim 10, further comprising the steps of:
    displaying at least one new data point in the scatterplot chart; and
    dynamically determining a new opacity level setting for all data points displayed in the scatterplot chart, including the at least one new data point based at least in part on the predetermined value for the MOUP in the scatterplot chart.

15. The one or more non-transitory computer-readable media of claim 10, further comprising the steps of:
    increasing the opacity level setting if the scatterplot chart has an over-plotting factor below a predetermined threshold, the over-plotting factor of the scatterplot chart comprising a total pixel area for displaying the plurality of data points divided by a pixel area of the scatterplot chart.

16. The one or more non-transitory computer-readable media of claim 10, wherein a utilized pixel in the scatterplot chart comprises a pixel having an opacity level greater than 0.

17. The one or more non-transitory computer-readable media of claim 10, wherein each data point is displayed in the scatterplot chart as a dot, a line, a rectangle, or a circle.

18. The one or more non-transitory computer-readable media of claim 10, wherein:
   data comprising the dataset are described by at least a first attribute and second attribute; and
   the scatterplot chart comprises a two-dimensional grid having a horizontal axis representing different values of the first attribute and a vertical axis representing different values of the second attribute.

19. A system configured for setting an opacity level for a scatterplot chart, comprising:
   a memory unit comprising an opacity engine and a user interface engine;
   a processor coupled to the memory unit and configured to execute the opacity engine and the user interface engine for:
      displaying, in a graphical user interface (GUI) on a display device, a plurality of data points on a scatterplot chart generated by a user interface engine executing on a computer processor, the data points being derived from a dataset;
      receiving a predetermined value for a mean opacity level of utilized pixels (MOUP) in the scatterplot chart;
      determining, by the computer processor, an opacity level setting for the plurality of data points based at least in part on the predetermined value, wherein each utilized pixel in the scatterplot chart comprises a pixel that represents at least one data point in the plurality of data points;
      setting, by the computer processor, an opacity level for the scatterplot chart to the determined opacity level setting; and
      displaying, in the GUI on the display device, the plurality of data points on the scatterplot chart at the opacity level.

20. The system of claim 19, wherein the predetermined value for the MOUP is between 35%-45%.

* * * * *